United States Patent
Hashiguchi

(10) Patent No.: US 7,850,144 B2
(45) Date of Patent: Dec. 14, 2010

(54) HOIST FOR ELEVATOR

(75) Inventor: Naoki Hashiguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1014 days.

(21) Appl. No.: 10/567,343

(22) PCT Filed: Aug. 5, 2003

(86) PCT No.: PCT/JP03/09933

§ 371 (c)(1),
(2), (4) Date: Dec. 5, 2006

(87) PCT Pub. No.: WO2005/012154

PCT Pub. Date: Feb. 10, 2005

(65) Prior Publication Data

US 2008/0164102 A1    Jul. 10, 2008

(51) Int. Cl.
*B66D 1/50* (2006.01)
(52) U.S. Cl. .................... 254/275; 254/273; 187/288
(58) Field of Classification Search ............... 254/267, 254/270, 273, 275; 187/254, 164, 289, 411, 187/409, 288; 384/130
See application file for complete search history.

(56) References Cited

U.S. PATENT DOCUMENTS

| | | | | |
|---|---|---|---|---|
| 5,018,603 A * | 5/1991 | Ito | ............... | 187/254 |
| 5,547,059 A * | 8/1996 | Watanabe et al. | ........... | 187/289 |
| 6,520,483 B1 * | 2/2003 | Miyoshi et al. | ............. | 254/267 |
| 6,796,548 B2 * | 9/2004 | Nagata et al. | ............... | 254/278 |
| 6,851,520 B2 * | 2/2005 | Nagata et al. | ............... | 187/286 |

FOREIGN PATENT DOCUMENTS

| | | |
|---|---|---|
| CN | 1269323 A | 10/2000 |
| DE | 198 32 208 | 11/1999 |
| DE | 199 06 727 | 6/2000 |
| EP | 1 043 261 B1 | 10/2000 |
| EP | 1 630 120 A1 | 3/2006 |
| JP | 53-140888 | 11/1978 |
| JP | 5-56618 | 3/1993 |
| JP | 11-079686 | 3/1999 |
| JP | 2000-153973 | 6/2000 |
| JP | 2000-289954 | 10/2000 |
| JP | 2001-151443 | 6/2001 |
| JP | 2002-122142 | 4/2002 |
| JP | 2002-284486 | 10/2002 |
| JP | 2003-104666 | 4/2003 |

* cited by examiner

*Primary Examiner*—Emmanuel M Marcelo
(74) *Attorney, Agent, or Firm*—Oblon, Spivak, McClelland, Maier & Neustadt, L.L.P.

(57) ABSTRACT

An elevator hoist apparatus includes a stationary frame member, a main shaft, a stationary element disposed to said stationary frame member, a rotary frame member supported on said main shaft and extending in a radial direction in axial opposition to said stationary frame member, a rotary element disposed to said rotary frame member in opposition to said stationary member, a brake unit including a brake portion extending through an opening in said stationary frame member, and a rope sheave disposed to said rotary frame member for rotation therewith. The brake unit includes a brake portion disposed in a hollow portion of the stationary frame member of the stationary member and extending through the opening portion and disposed to the inner circumference of the stationary frame member or the rotary frame member. The magnetic path for the brake unit extends through one portion of the rotary frame member or the stationary frame member. Small-size and high performance are realized.

20 Claims, 15 Drawing Sheets

HOIST FOR ELEVATOR

TECHNICAL FIELD

This invention relates to an elevator hoist apparatus for mainly used in an elevator system without a machine room.

BACKGROUND ART

In a conventional thin-type elevator hoist apparatus such as the one disclosed in Japanese Patent Laid-Open No. 2000-289954, for example, has provided with a cup-shaped base member open at one side, a main shaft planted within the base member at the center of the bottom wall of the cup, a stationary member winding disposed on the inner circumferential surface of the base member, a cup-shaped member pivotally supported for rotation on the main shaft within the cup-shaped base member, and an armature disposed on the outer circumferential surface of the cup-shaped member in opposition to the stationary member winding to constitute an electric motor portion. A drive sheave is formed on the outer circumferential surface of the cup-shaped member. Also, a brake including a brake shoe for braking disposed in opposition to a brake surface on the inner circumferential surface of the cup-shaped member is provided between the base member and the rotatable cup-shaped member.

The rotatable cup-shaped member and the drive sheave provided thereon are generally covered by the stationary cup-shaped member and the support plate, so that the base member has formed therein an opening portion for allowing the elevator main ropes to pass through the opening portion.

Also, on the outer circumferential cylindrical surface portion of the rotary cup-shaped member, a permanent magnet generator is mounted, and on the inner circumferential surface of the base member opposing to the armature, a stationary element is disposed with a small gap therebetween to define an electric motor together with the armature and the stationary element. Also on the outer circumferential portion of the cup-shaped base member, a support plate which is a brake frame is fastened, which has mounted thereon a brake unit. The brake unit works when a brake arm pivotally supported on the support plate presses the brake shoe against the inner circumferential surface (brake surface) on the cup-shaped member outer circumference portion to apply braking force to the rotation of the rope sheave.

Also, on the main shaft at the radially inner side of the brake unit, a main shaft for an encoder or a shaft with a disc is mounted, thereby to transmit a rotation signal to the encoder mounted on the stationary base member.

The conventional elevator hoist apparatus has the structure as above-described and has the thickness smaller than the elevator hoist apparatus before that. However, as the required torque of the elevator hoist apparatus increases, such thin-type elevator apparatus must have an increased thickness. In an elevator system without machine room, the elevator hoist apparatus is usually disposed in a space between the elevator car in the hoistway and the hoistway wall. However, as the thickness of the elevator hoist apparatus increases, the dead space between the elevator car in the hoistway and the hoistway wall or the space occupied by the hoistway though not utilized is increased. Therefore, the elevator hoist apparatus is required to be made further smaller in the axial dimension (thickness as measured in the direction of rotating axis of the rope sheave).

DISCLOSURE OF INVENTION

Accordingly, the object of the present invention is to provide an elevator hoist apparatus having a thinner and simpler structure.

With this object in view, the elevator hoist apparatus of the present invention comprises a stationary frame member, a main shaft, a stationary element disposed to said stationary frame member, a rotary frame member supported on said main shaft and extending in a radial direction in axial opposition to said stationary frame member; a rotary element disposed to said rotary frame member in opposition to said stationary member; a brake unit including a brake portion extending through an opening in said stationary frame member; and a rope sheave disposed to said rotary frame member for rotation therewith.

BEST MODE FOR CARRYING OUT THE INVENTION

Embodiment 1

Figure 1:
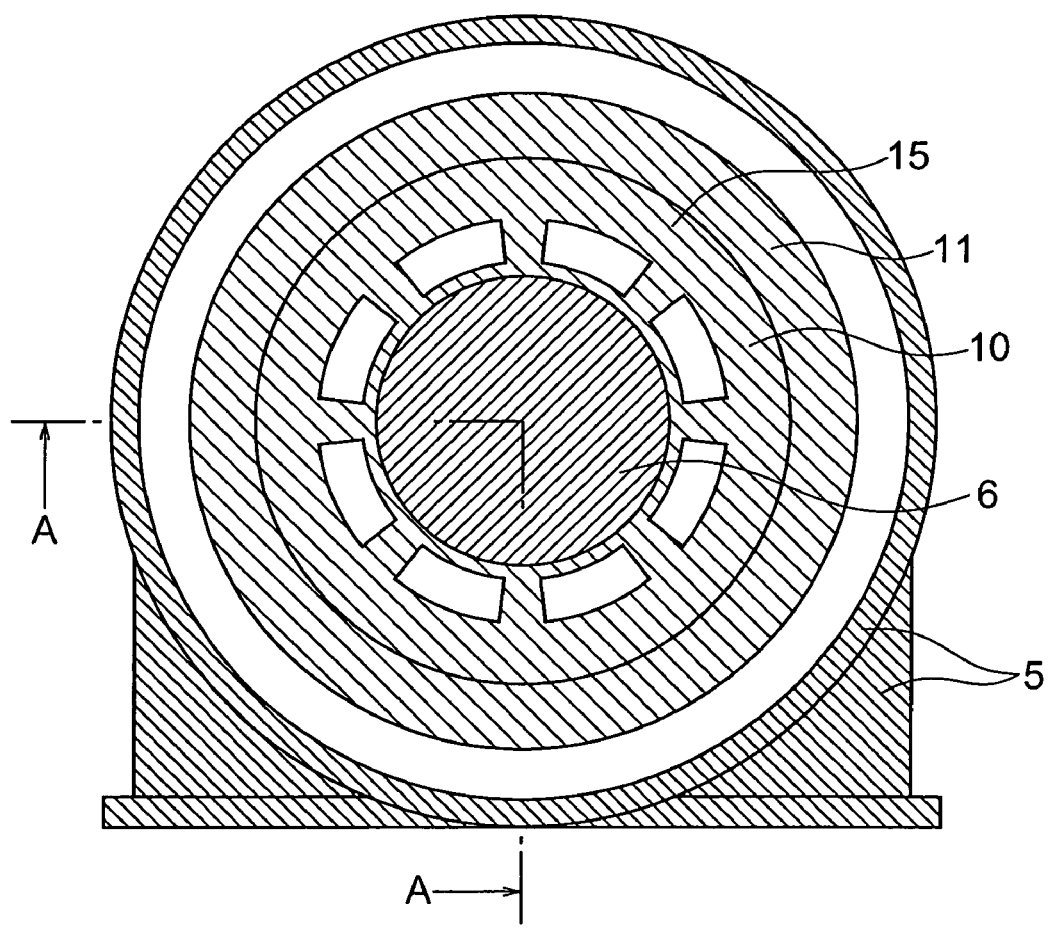
FIG. 1 is a plan view of the elevator hoist apparatus of the first embodiment of the present invention.
Figure 2:
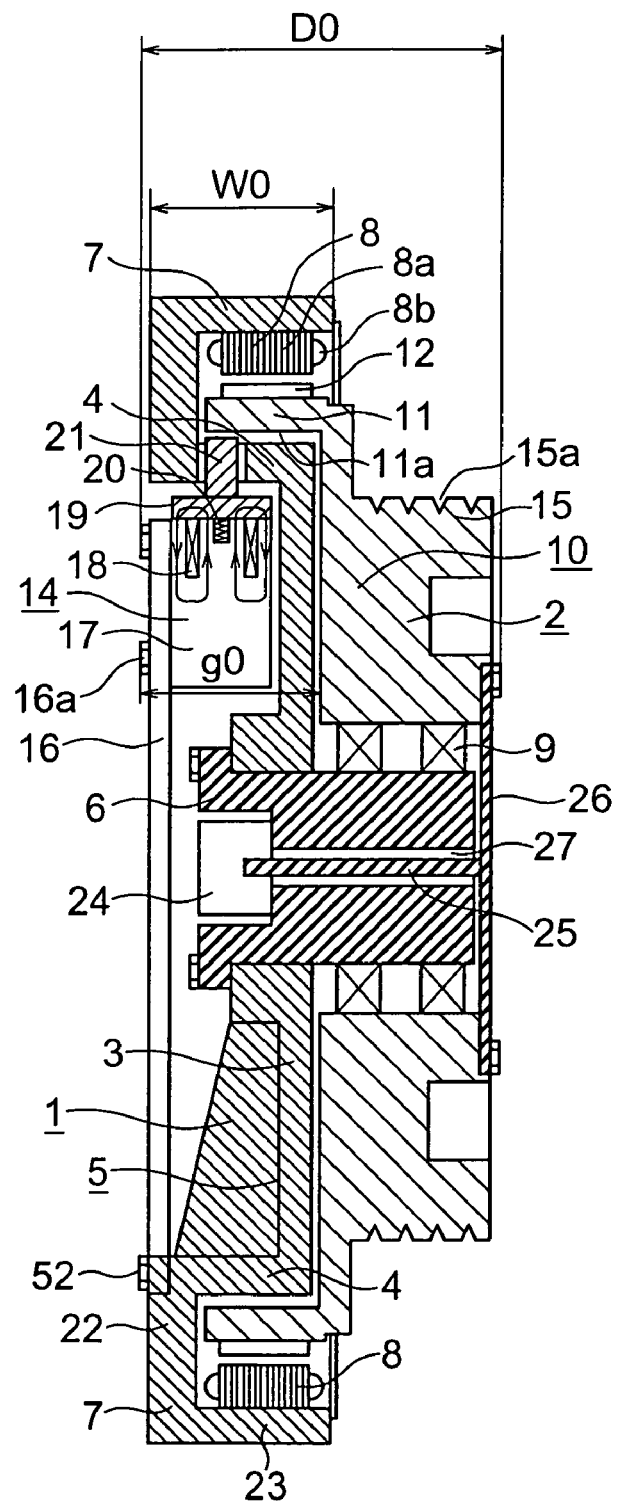
FIG. 2 is a sectional view taken along line 2-2 extending through the rotational axis of the elevator hoist apparatus of FIG. 1.
Figure 3:
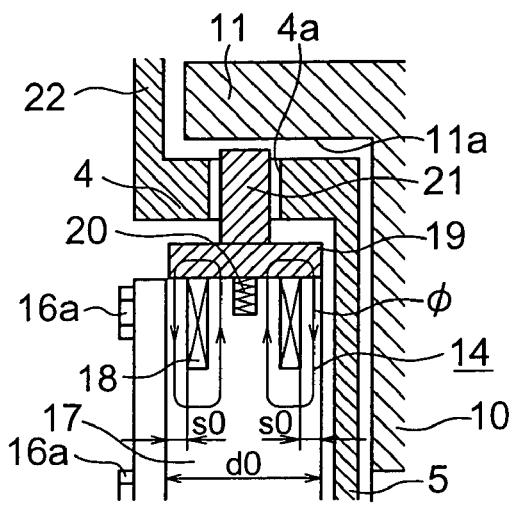
FIG. 3 is a sectional view around the brake unit of the elevator hoist apparatus of the first embodiment of the present invention shown in FIG. 2.
Figure 4:
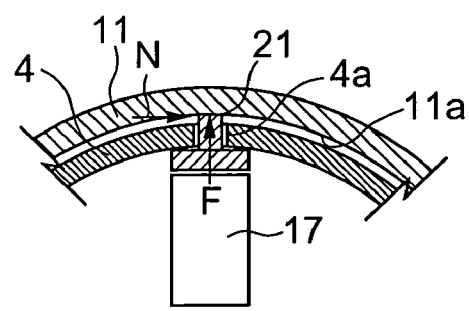
FIG. 4 is a front view around the brake unit of the elevator hoist apparatus shown in FIG. 3.
Figure 5:
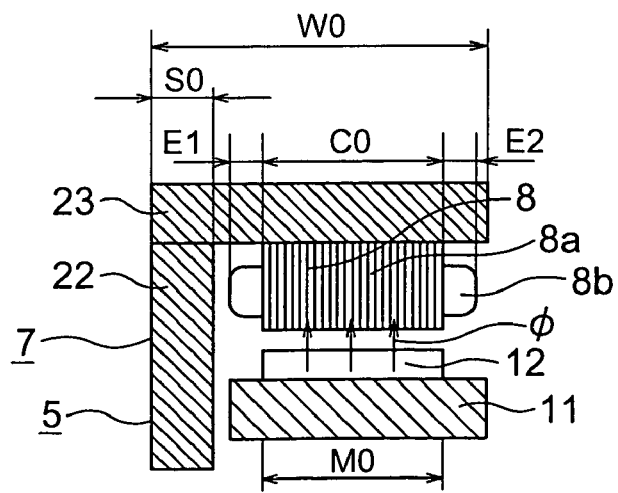
FIG. 5 is a sectional view around the motor portion of the elevator hoist apparatus shown in FIG. 2.

FIG. 1 is a plan view of the elevator hoist apparatus of the first embodiment of the present invention, FIG. 2 is a sectional view taken along line 2-2 extending through the rotational axis of the elevator hoist apparatus of FIG. 1, FIG. 3 is a sectional view around the brake unit of the elevator hoist apparatus of the first embodiment of the present invention shown in FIG. 2, FIG. 4 is a front view around the brake unit of the elevator hoist apparatus shown in FIG. 3, and FIG. 5 is a sectional view around the motor portion of the elevator hoist apparatus shown in FIG. 2. Here, an example of an elevator hoist apparatus in which the dimension (thickness) of the hoist apparatus in the axial direction (direction of rotary central axis) is smaller than the dimension (outer diameter) in the radial direction is illustrated.

As best shown in FIG. 2, an elevator hoist apparatus comprises a stationary member 1 and a rotary member 2 rotatably supported by the stationary member 1.

The stationary member 1 comprises a generally shallow dish-shaped stationary frame member 5 including a circular plate portion 3 and a cylindrical portion 4 disposed to an outer circumferential portion of the circular plate portion 3, a main shaft 6 extending perpendicularly in a cantilevered manner from the center of the stationary frame member 5, a stationary element mounting portion 7 supported by the cylindrical portion 4 of the stationary frame member 5, and stationary elements 8 disposed on the stationary element mounting portion 7 for generating magnetic fluxes passing through the stationary element mounting portion 7. Each of the stationary elements 8 comprises a core 8a and a coil 8b.

The rotary member 2 comprises a rotary frame member 10 rotatably supported by a bearing 9 on the main shaft 6, the rotary member 2 being axially adjacent to the stationary frame member 5 and extended in the radial direction, a rotary element mounting portion 11 supported from the rotary frame member 10 and defining a magnetic circuit together with the stationary element mounting portion 7, and rotary elements 12 which are permanent magnets disposed on the rotary element mounting portion 11 at the position where they can be opposed to the stationary elements 8.

The elevator hoist apparatus further comprises brake units 14 which, as shown in detail in FIGS. 3 and 4, is disposed at the inner circumference of the stationary frame member 5 of the stationary member 1 and the rotary frame member 10 of the rotary member 2. The brake unit 14 is mounted to a brake mounting plate 16 secured to the cylindrical portion 4 of the stationary frame member 5 and supported at a position radially inward with respect to the cylindrical portion 4 so that it extends through an opening portion 4a of the cylindrical portion 4 and is brought into contact with the inner circumferential surface of the rotary element mounting portion 11 of the rotary member 2 opposite to the side where the stationary elements are attached, thereby providing a braking force. The brake unit 14 comprises a brake frame 17 supported from the brake mounting plate 16, an electromagnetic coil 18 supported from the brake frame 17, a plunger 19 movable into an open position when attracted by the electromagnetic coil, a compression spring 20 for biasing the plunger 19 toward the braking position, and a brake portion 21 which is a brake shoe portion disposed on the plunger 19 and extends through the opening portion 4a of the cylindrical portion 4 of the stationary frame member 5 toward the brake surface 11a which is the inner circumferential surface of the rotary element mounting portion 11 of the rotary member 2.

The rotary member 2 of the elevator hoist apparatus further comprises a rope sheave 15 that is disposed on the rotary frame member 10 for rotation with the rotary frame member 10. The rope sheave 15 is a cylindrical portion of the rotary frame member 10 provided on the outer circumferential portion of the hub portion of the rotary frame member 10 as a continuous, one-piece, integral portion provided at its outer circumferential surface with a rope grooves 15a. The rope sheave 15 is disposed at a position radially outward and substantially corresponding to the bearing 9 supporting the rotary frame member 10, so that the load from the ropes acts on the bearing 9 as a force in the radial direction.

The stationary element mounting portion 7 disposed on the most outward circumference portion of the stationary frame member 5 is an annular member of an L-shaped cross section having an annular plate portion 22 provided on the cylindrical portion 4 which is the outer circumference portion of the stationary frame member 5 and extending therefrom in the radially outward direction as well as a cylindrical portion 23 axially extending from the annular plate portion 22. The stationary element mounting portion 7 of the L-shaped cross section on the stationary frame member 5, in cooperation with the frame member cylindrical portion 4, constitutes a generally U-shaped cross section portion, in which the stationary elements 8 are attached. Also, the rotary element mounting portion 11 of the rotary member 2 is disposed within this U-shaped cross section portion between the stationary frame member cylinder portion 4 and the stationary elements 8 together with the rotary elements 12 which are magnet armatures, and the rotary elements 12 are disposed in a radially opposing relationship with respect to the stationary elements 8.

The elevator hoist apparatus also comprises an encoder 24 attached on the axis of the main shaft 6, the encoder main shaft 25 is supported on the central axis by a support disc plate 26 secured to the rotary frame member 10 and is inserted into a central bore 27 of the main shaft 6.

The followings are the further discussion of the structure of the elevator hoist apparatus of the present invention. The rotary element mounting portion 11 of the rotary frame member 10 is inserted between the cylinder portion 4 of the stationary frame member 5 and the cylinder portion 23 of the stationary element mounting portion 7 in a telescopic relationship, wherein the rotary elements 12 and the stationary elements 8 are opposed to each other to constitute an electric motor. Disposed on the inner circumferential side of the cylinder portion 4 of the stationary frame member 5 is the brake unit 14.

The brake frame 17 of the brake unit 14 is supported by the brake mounting plate 16 fastened by bolts 52 to the cylinder portion 4 of the cup-shaped stationary frame member 5 at the end portion of opposite to the rotary member 2 (i.e., outer side surface of the hoist apparatus or left side in the figure). The brake unit 14 urges the brake portion 21 extending through the opening portion 4a in the stationary frame member 5 against the rotary element mounting portion 11 to achieve braking of the rotation of the rope sheave 15, with the inner circumferential surface of the cylindrical rotary element mounting portion 11 utilized as the braking surface. That is, when the motor is not running, the electromagnetic coils 18 of the brake unit 14 are not current-carrying state, the brake portion 21 is biased in the direction of separating from the brake frame 17 by the compression spring 20 disposed within the brake frame 17, and the tip portion of the brake portion 21 is urged against the inner brake surface of the rotor element mounting portion 11 to provide a braking force. When the motor is to be rotated, the electromagnetic coils 18 of the brake unit 14 are energized, attracting the brake portion 21 to the brake frame 17, thereby separating the brake portion 21 from the inner braking surface of the rotary element mounting portion 11 to release the brake. As for the brake units 14, two of them may be provided on one motor, but may be one or more than two.

As illustrated in FIG. 3, the brake unit 14 is mounted to the brake mounting plate 16. FIG. 3 illustrates the state where the electromagnetic coil 18 is energized, wherein the magnetic flux flows only through the brake unit 14 itself and causes the brake portion 21 to be attracted to the brake frame 17. In other words, the brake unit 14 is designed to perform its braking function by itself, without utilizing other components other than the brake unit 14. Thus, the thickness dimension gO between the side face of the rotary frame member 10 on side of the brake unit 14 and the outer end surface of the thin-type hoist apparatus opposite to the rope sheave 15 in the direction of the central rotational axis of the motor is a sum of the thickness of the brake mounting plate 16, thickness of the head of the bolt 16a fastening the brake unit 14 to the brake mounting plate 16, the thickness of the stationary frame member 5 at the portion adjacent to the brake unit 14, the gap between the brake unit 14 and the stationary frame member 5, and the gap between the stationary frame member 5 and the rotary frame member 10.

FIG. 4 illustrates the opening portion 4a formed in the cylindrical portion 4 of the stationary frame member 5 in connection with the brake unit 14 and its vicinity. The arrangement is such that the brake unit 14 extends from the brake portion 21 and passes through the opening portion 4a of the inner cylinder portion 4 of the stationary frame member 5 toward the braking surface 11a of the rotary element mounting portion 11 and, upon the brake operating command, the brake portion 21 is urged against the braking surface 11a by a force F (FIG. 4). The opening portion 4a of the stationary frame member 5 functions as a guide for the brake portion 21 and supports the circumferential force N (FIG. 4) acting on the brake portion 21 during braking, so that there is no need to separately provide any parts or braces for guiding the brake portion 21.

FIG. 5 is an enlarged view of the stator element 8 (electromagnet) of the motor portion of the elevator hoist apparatus, the stator element (electromagnet) 8 comprising the core 8a and the coil 8b wound on the core 8a. In the PM motor, the permanent magnet 12 is used on the rotary element side, but the permanent magnet 12 is expensive, so that it is also required to minimize the use of the permanent magnet material as small as the necessary effect is obtained. Therefore, in the example illustrated in FIG. 5, the width MO of the permanent magnet 12 of the rotary element 2 is made equal to the width CO of the core, and the width dimension WO of the motor portion of the elevator hoist apparatus is determined by the sum of the width CO of the core 8a of the stator element 8, dimensions E1 and E2 of the terminal ends of the coil 8b and the thickness SO of the stationary frame member 5. In the conventional thin-type elevator hoist apparatus mainly used in the elevator system without the machine room, the thickness in the direction of the rotating central axis (axial direction) of the rope sheave 15 is made small. However, as the required torque of the elevator hoist apparatus increases, even when it is thin-type elevator hoist apparatus, it is required to gradually increase the thickness dimension. In the elevator without machine room, the elevator hoist apparatus is usually disposed in a space between the car in the hoistway and the hoistway wall, but the dead space between the car in the hoistway and the hoistway wall which is the hoistway space not used increases as the thickness of the elevator hoist apparatus increases. Therefore, the elevator hoist apparatus is required to further make the thickness dimension in the direction of sheave rotating central axis thinner. In order to make the thickness dimension DO in the direction of sheave rotating central axis thinner of the elevator hoist apparatus shown in FIGS. 1 to 5 thinner, it is required to make the thickness dimension gO (FIG. 3) defined between the side face on the brake unit side of the rotary frame member 10 and the outer end of the elevator hoist apparatus facing to the rope sheave 15 in the direction of motor rotating central axis.

The thin-type elevator hoist apparatus of the present invention has the structure as above described and is superior as compared to the conventional thin-type elevator hoist apparatus.

Firstly, the structure supporting the rotary portion is not employed or the housing does not cover the outside of the thickness, and the axial thickness dimension is made thinner by the wall thickness of the housing.

Secondly, the opening portion 4a of the stationary frame member 5 exhibits a guiding function when the brake portion 21 is moved as well as a supporting function during braking for supporting the circumferential force acting on the brake portion 21. Therefore, separate guiding component is unnecessary and the number of the parts can be reduced.

Thirdly, the rope sheave 15 is not covered by the housing. In the conventional thin-type elevator hoist apparatus, the rope sheave is covered by the housing, so that the rope winding work has been made difficult by the housing when the rope was to be wound around the sheaves and exchange of the ropes in the already installed elevator system. However, in the thin-type elevator hoist apparatus of this invention, the rope sheave is not covered by the housing, so that such the problem does not arise.

Embodiment 2

Figure 6:
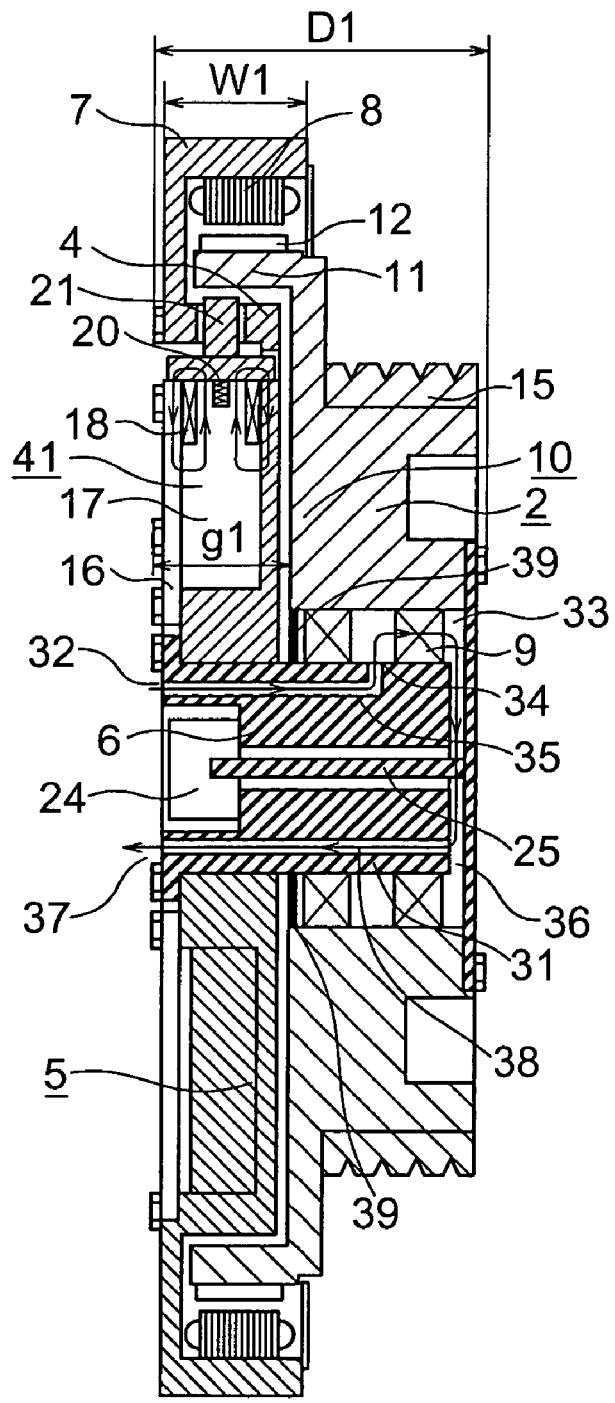
FIG. 6 is a sectional view taken along the rotational axis of the elevator hoist apparatus of the second embodiment of the present invention.
Figure 7:
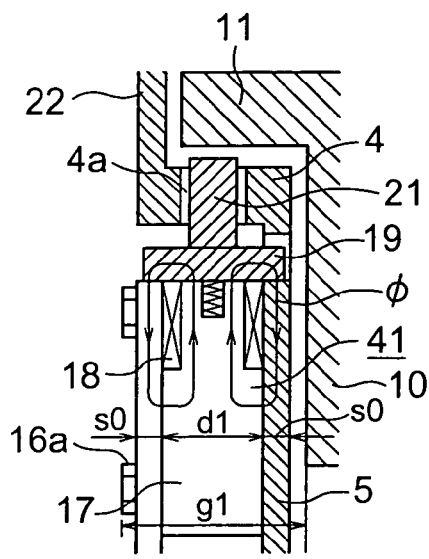
FIG. 7 is a sectional view around the brake unit of the elevator hoist apparatus shown in FIG. 6.
Figure 8:
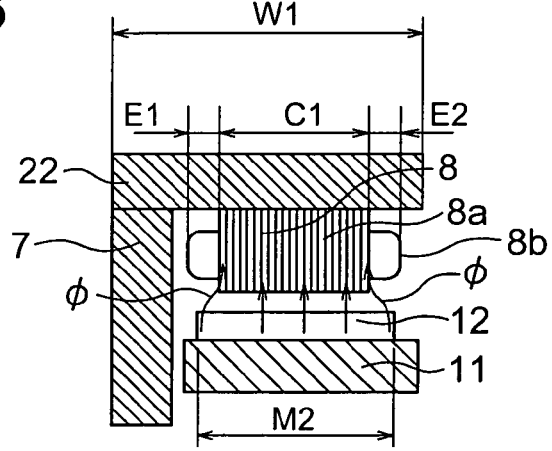
FIG. 8 is a sectional view around the motor portion of the elevator hoist apparatus shown in FIG. 6.

FIGS. 6 to 8 are views corresponding to FIGS. 3 to 5 and are sectional views illustrating the second embodiment of the elevator hoist apparatus of this invention. In this elevator hoist apparatus, as seen from FIG. 6, the main shaft 6 is provided with a flow path 31 for circulating and supplying bearing lubricating oil to the bearing 9. The flow path 31 comprises a oil supply path 35 which includes an oil supply outlet 32 open at the end face of the stator element side of the main shaft 6, extends in the axial direction and which includes an outlet opening 34 open to a bearing space 33 in which the bearing 9 is accommodated, and an oil return path 38 which includes an inlet opening 36 at the end face of the stator element side of the main shaft 6, extends in the axial direction and which includes a discharge opening 37 open at the end face of the stator element side. The bearing space 33 is sealed by an annular seal mechanism 39 sealing the clearance between the main shaft 6 and the rotary frame member 10, on one hand, and by the support disc 26 of the encoder main shaft 25 sealingly attached to the rotary frame member 10, on the other hand. Therefore, the bearing 9 between the stator member 1 and the rotor member 2 is sealed within the bearing space sealed by the oil leakage prevention mechanism and to which lubricating oil is circulated and supplied.

Thus, since the seal mechanism 39 for preventing the oil leakage from the bearing 9 is disposed at least between the bearing 9 and the brake surface 11a of the rotary element mounting portion 11 of the rotary member 2 on the side opposing to the stationary frame member 5 on the rotating central axis of the rotary member 2, the oil is prevented from flowing into the side of the brake surface 11a of the rotary member 2 which should be particularly protected from oil and contaminates the brake surface 11a. Thus, in order to provide the brake surface 11a of the inner cylinder portion of the stationary frame member 5 with a structure free of the oil contamination so that a constant coefficient of friction may be maintained for stable braking, the seal mechanism 39 for oil leakage prevention is disposed on the side close to the brake surface in the direction of motor rotational central axis, whereby the lubricating oil contained in the bearing is prevented from flowing onto the brake surface.

At the time of periodic maintenance, fresh lubricating oil is poured from the lubricating oil supply port 32 into the flow path 31. The poured lubricating oil lubricates the bearing 9 and the oil deteriorated due to usage is discharged from the discharge port 37. The periodical maintenance of the elevator hoist apparatus mainly includes injection of the lubricating oil into the bearing 9 and inspection and maintenance of the brake unit 41, both of which can be easily achieved because they are accessible from the same side of the stationary member 1 in the direction of the central rotational axis of the motor. Also, the apparatus can be installed very closely to the hoistway wall at the side on which no maintenance is required, i.e., the side of the rope sheave 15, thereby decreasing the hoistway space to minimum.

Also, the bearing 9 may be replaced by an oilless bearing. When an oilless type bearing in which oil is impregnated, for example, is used, the oil leakage can be more strictly prevented, and the need for pouring the lubricating oil at the time of periodical maintenance is eliminated.

FIG. 7 illustrates the brake unit 41 of the elevator hoist apparatus. The brake frame 17 of the brake unit 41 is, similarly to the brake unit 14 shown in FIG. 3, supported by the brake mounting plate 16 secured to the cup-shaped stationary frame member 5 and the brake portion 21 is urged against the brake surface 11a which is the inner circumferential surface of the cylindrical rotary element mounting portion 11. In FIG. 7, which illustrates the state in which the electromagnetic coil is energized, the brake frame 17 of the stationary frame member 5 and the nearby component other than the brake frame 17 (here, the stationary frame member 5 and the brake mounting plate 16) are positioned in contact with or very slightly spaced apart from the brake frame 17, whereby, when the brake unit 14 is energized, the magnetic flux from the electromagnetic coil 18 is allowed to flow through the brake frame 17 of the stationary frame member 5 and the nearby component such as stationary frame member 5 and the brake mounting plate 16, so that the brake frame 17 and the nearby stationary frame member 5 and the brake mounting plate 16 can be utilized as a portion of the brake frame 17 or a portion of the magnetic circuit.

That is, in the example shown in FIG. 3, brake frame 17 was required to have a thickness dO providing the thickness sO for allowing the magnetic flux to flow without saturation to the outside of the electromagnetic coil 18, but in the brake unit 41 shown in FIG. 7, the thickness of the brake mounting plate 16 of a magnetic material is made sO and the thickness of the stationary frame member 5 is made sO, so that the thickness dimension of the brake frame 17 can be reduced to d1. This allows the brake frame 17 to be thinner in the direction of rotation central axis of the motor, so that the thickness dimensions between the side surface on the side of the brake unit 41 of the rotary frame member 10 and the outer end of the elevator hoist apparatus opposing to the rope sheave 9 in the direction of the motor rotation central axis of the elevator hoist apparatus can be made smaller than gO shown in FIG. 3. Therefore, a hoist apparatus of the thickness D1 (D1<DO of embodiment 1, FIG. 2) can be realized.

FIG. 8 is an enlarged view around the core 8a of the stator element 8 of the motor portion of the elevator hoist apparatus of embodiment 2 shown in FIG. 6. In order to make the width dimension (axial dimension) of the motor portion, the overall width (core 8a+coil 8b) of the stator element 8 is made as small as possible as the necessary torque may be maintained and the width M2 of the permanent magnet M2 is made larger than the width C1 of the core. By making the width M2 of the permanent magnet M2 larger than the width C1 of the core, the magnetic flux φ flowing from both ends of the permanent magnet 12 may be utilized, so that the necessary width of the core 8a for obtaining the same torque can be made smaller and the width of the motor portion can be made smaller, thereby making the thickness dimension of the motor portion small. For example, by making the width M2 of the permanent magnet 12 smaller than the width C1 of the core by several millimeters, the width of the core 8a necessary for obtaining the equal torque can be made smaller.

Figure 9:
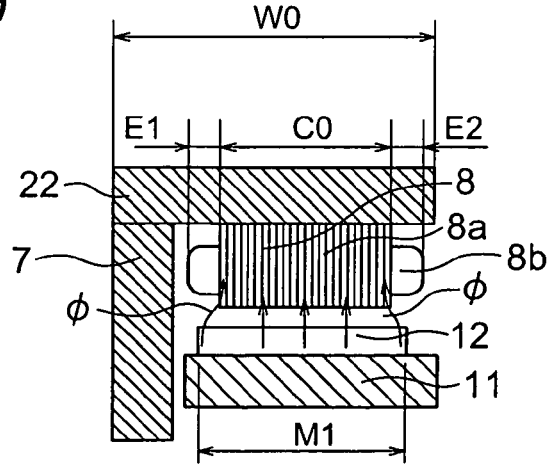
FIG. 9 is a sectional view around the motor portion of the elevator hoist apparatus similar to that shown in FIG. 6.

That is, as seen from FIGS. 5 and 9, the motor shown in FIG. 9 provides a greater torque than the motor of FIG. 5 even the motor width dimension is the same WO because the magnetic flux φ comes out of both ends of the permanent magnet 12 to flow into the core 8a. On the contrary, as shown in FIG. 8, the torque equal to that of the motor shown in FIG. 5 can be obtained even when the width of the permanent magnet 12 is made M2 smaller than M1 shown in FIG. 9. Thus, the smaller width of the core 8a allows torque of the motor to be equal with a width W1 smaller than the width WO, so that the thickness dimension of the motor portion in the direction of the rope sheave rotation center axis can be made smaller than that of the conventional design.

This elevator hoist apparatus has a structure similar to the embodiment 1 in other respects.

Embodiment 3

Figure 10:
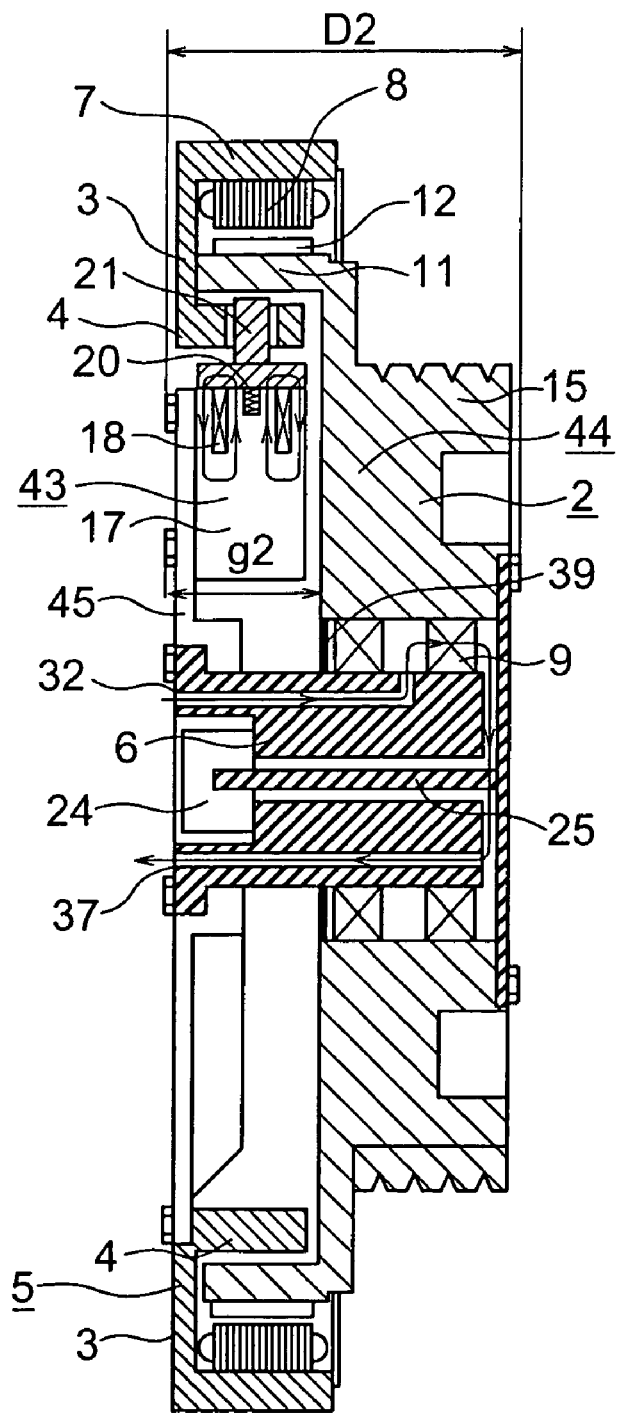
FIG. 10 is a sectional view taken along the rotational axis of the elevator hoist apparatus of the third embodiment of the present invention.

In the thin-type elevator hoist apparatus of the embodiment 3 of the present invention shown in FIG. 10, the thin-type motor does not have the stationary frame member between the brake unit 43 and the rotary frame member 44. In this elevator hoist apparatus, the brake mounting plate 45 secured to the cylindrical portion 4 of the stationary frame member 5 for supporting the brake frame 17 of the brake unit 43 support the main shaft 6 in the cantilever manner. Therefore, the disc plate portion of the stationary frame member adjacent to the rotary frame member 10 in the direction of motor rotational central axis is removed, enabling the thickness D of the hoist apparatus to be as thin as D2. That is, the stationary frame member 5 is constituted only by the generally U-shaped cross section portion which comprises the stationary element mounting portion 7 of the L-shaped cross section and the frame member cylindrical portion 4, and the stationary elements 8 are attached to the U-shaped cross section portion. Also, the rotary element mounting portion 11 of the rotary member 2 is disposed together with the rotary elements 12 which are magnet armatures within the U-shaped cross section portion and between the stationary frame member cylinder portion 4 and the stationary elements 8, and the rotary elements 12 are positioned in opposition to the stationary elements 8 in radial direction.

That is, the overall thickness dimension of the embodiment of FIG. 1 can be made smaller by the thickness of the disc portion 3 of the rotary frame member 5, so that the thickness g0, which is the dimension between the side surface of the brake unit side and the outer end of the elevator hoist apparatus opposing to the rope sheave in the direction of the motor rotational central axis of the elevator hoist apparatus, can be made g2. Therefore, the hoist apparatus can be made to have a thickness D2 smaller than the thickness D0 in the direction of the motor rotational central axis of the elevator hoist apparatus (D2<D0 of Embodiment 1 (FIG. 2)). Here, the brake mounting plate 45 is connected to the stationary frame member 5 and have a function of a support structure for supporting the load on the main shaft together with the stationary frame member 5. In other words, the disc portion 3 which supports the cylindrical portion 4 of the stationary frame member 5 supports the brake unit 14. The connection between the brake mounting plate 45 and the stationary frame member 5 may be made by fitting. Other structure is similar to that of Embodiment 2. Also, the brake mounting plate 45 may have ribs for additional strength for supporting the load acting on the main shaft.

Embodiment 4

Figure 11:
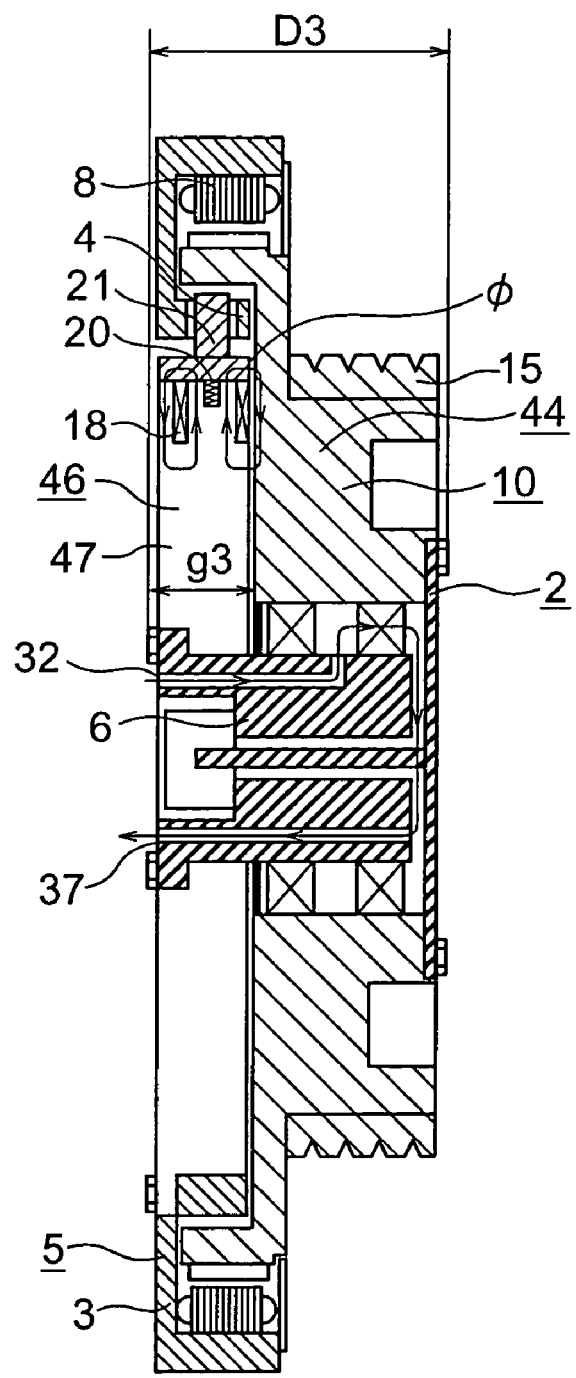
FIG. 11 is a sectional view taken along the rotational axis of the elevator hoist apparatus of the fourth embodiment of the present invention.
Figure 12:
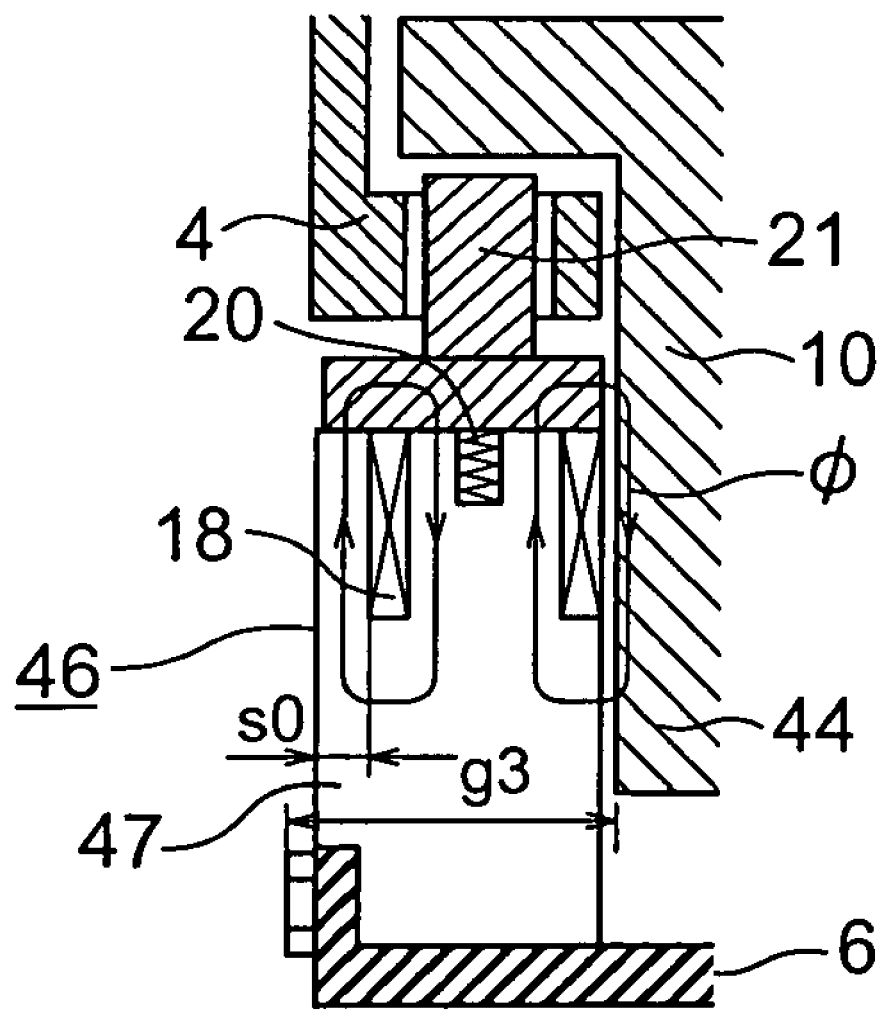
FIG. 12 is a sectional view around the brake unit of the elevator hoist apparatus shown in FIG. 11.

In the elevator hoist apparatus of Embodiment 4 illustrated in FIGS. 11 and 12, the brake mounting plate 47 of the brake unit 46 is a single piece component integral with the brake frame and have a small gap as small as 2 mm, for example, between the brake mounting plate 47 (the brake frame) and the rotary frame member 10. The brake mounting plate 47 is also a brake frame, so that it can be said that the disc portion 3 which supports the cylindrical portion 4 of the stationary frame member 5 supports the brake unit 14. In other respects, the structure is similar to that of Embodiment 3 illustrated in FIG. 10.

According to this structure, the brake mounting plate 47 is integral with the brake frame, so that the number of parts is decreased and the structure is simplified. As seen from FIG. 12, the dimension sO of the path for the magnetic flux generated from the electromagnetic coil 18 defined between the electromagnetic coil 18 and the outer surface of the brake unit 46 of the side in opposition to the rope sheave 15 in the direction of axis of the rope sheave 15 can be made the smallest necessary dimension for allowing the magnetic flux needed for actuating the brake, so that the width dimension can be made further smaller than that of the preceding embodiments. Also, by making the gap between the brake mounting plate 47 (the brake frame) and the rotary frame member 10 very small, the magnetic flux from the electromagnetic coil 18 of the brake unit 46 is allowed to flow through the rotary frame member 10 when the brake unit 46 is energized, whereby the portion of the rotary frame member in the vicinity of the brake mounting plate 47 can be utilized as a portion of the brake frame. In other words, the brake frame can be made thinner in the direction of motor rotational central axis, and the thickness dimension between the side surface of the rotary frame member 10 on the side of the brake unit 46 and the outer end of the elevator hoist apparatus opposite to the rope sheave in the direction of the rotational central axis of the motor of the elevator hoist apparatus can be made as small as g3, whereby the brake unit 46 can be made thin. Thus, an elevator hoist apparatus having a small thickness of D3 can be realized.

Embodiment 5

Figure 13:
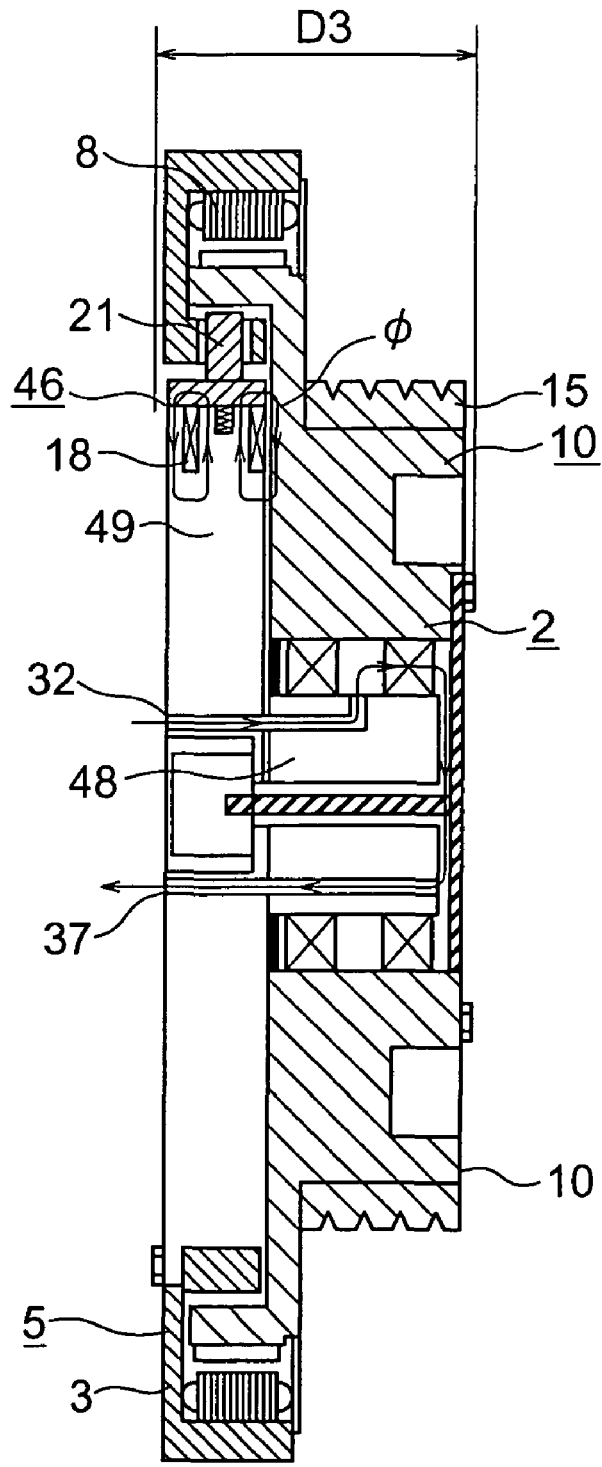
FIG. 13 is a sectional view taken along the rotational axis of the elevator hoist apparatus of the fifth embodiment of the present invention.

FIG. 13 illustrates the elevator hoist apparatus of Embodiment 5 of the present invention. In this elevator hoist apparatus, the main shaft 48 is integrated with the brake mounting plate 49 similar to the brake mounting plate 47 of Embodiment 4 shown in FIG. 11 into a one-piece component, and the structure is similar to that of Embodiment 4 shown in FIG. 11 in other respects. In this elevator hoist apparatus, the main shaft 48 and the brake mounting plate 49 are combined into a one-piece component, so that the number of parts is further decreased and the structure can be made simpler.

Embodiment 6

Figure 14:
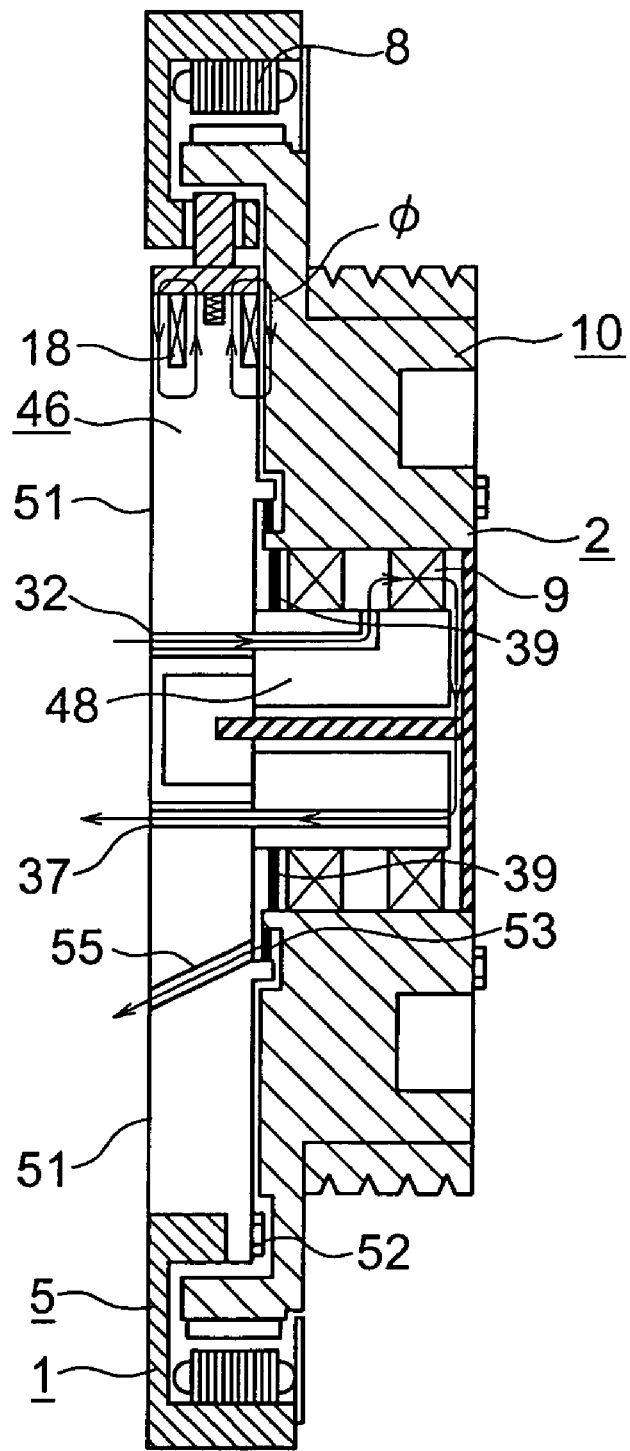
FIG. 14 is a sectional view taken along the rotational axis of the elevator hoist apparatus of the sixth embodiment of the present invention.

The basic structure of the elevator hoist apparatus of Embodiment 6 shown in FIG. 14 is the same as that of Embodiment 5. However, as seen from the figure, the brake mounting plate 51 of the brake unit 46 is arranged to be assembled into the stationary frame member 5 from the side of the rotary member 2 as viewed in the direction of axis of the motor and is fastened thereto by bolts 52. Therefore, the direction of assembly of the brake unit 46 into the stationary frame member 5 and the direction of assembly of the rotary member 2 into the main shaft 48 can be made the same, allowing the assembly of the elevator hoist apparatus to be achieved from one direction to improve the assembly. Further, in order to prevent the leaked oil from reaching the brake surface of the rotary frame member 10 when the first seal mechanism 39 which is the oil leakage prevention mechanism closest to the bearing 9 is broken and the oil leaks therefrom, a second seal mechanism 53 which is the second oil leakage prevention mechanism is provided. Although the first and the second seal mechanisms 39. 53 are provided in the illustrated example, more oil leakage prevention mechanisms may be provided according to necessity. Also, a drain port 55 for draining the leaked oil from the elevator hoist apparatus is provided. This drain port may be common to an inspection hole for the oil leakage which is sometimes provided because the bearing oil leakage must be inspected at the time of the periodical maintenance of the motor.

Embodiment 7

Figure 15:
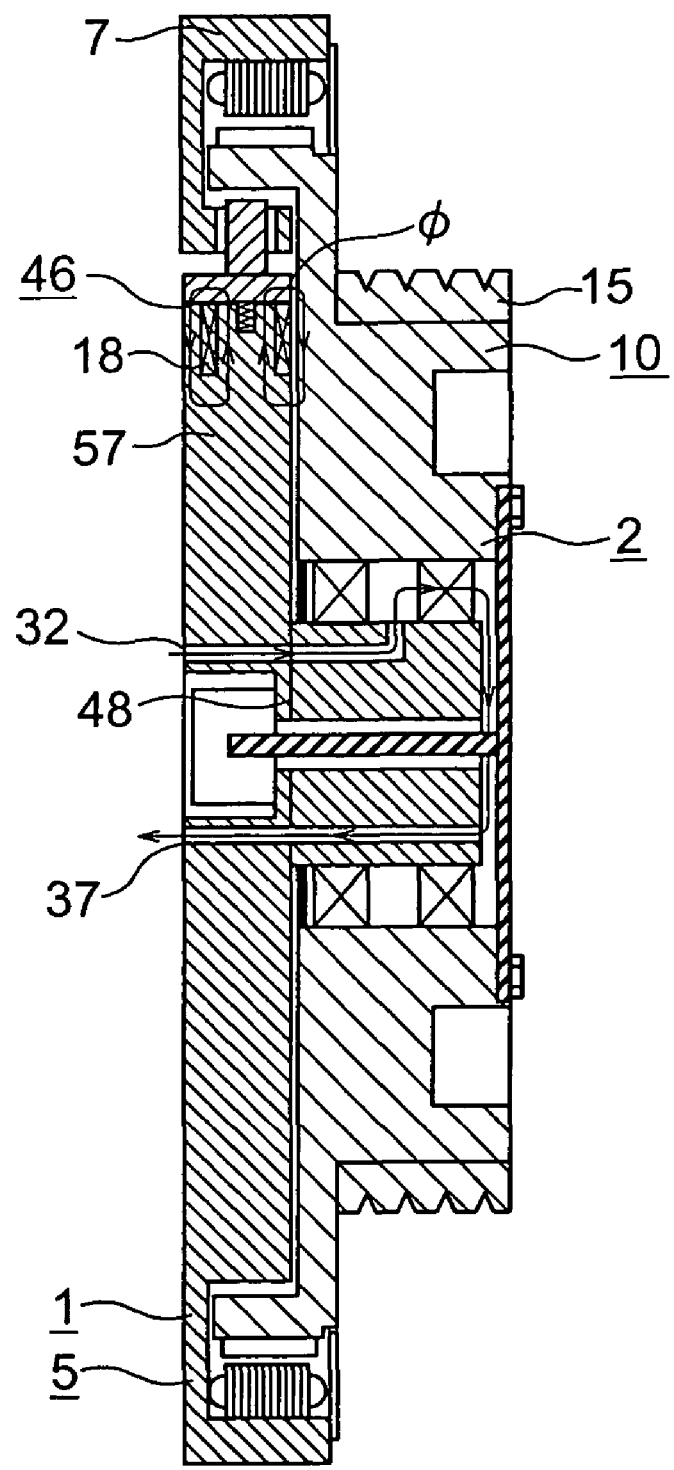
FIG. 15 is a sectional view taken along the rotational axis of the elevator hoist apparatus of the seventh embodiment of the present invention.

The basic structure of the elevator hoist apparatus of Embodiment 7 of the present invention shown in FIG. 15 is similar to that of Embodiment 5, but is different in that the stationary frame member 57 is a one-piece integral component having functions of the brake frame and the brake mounting plate. Therefore, the brake frame and the brake mounting plate as separate parts can be eliminated, further decreasing the number of parts and further simplifying the structure. In other respects, the structure is similar to that shown in FIG. 13.

Embodiment 8

Figure 16:
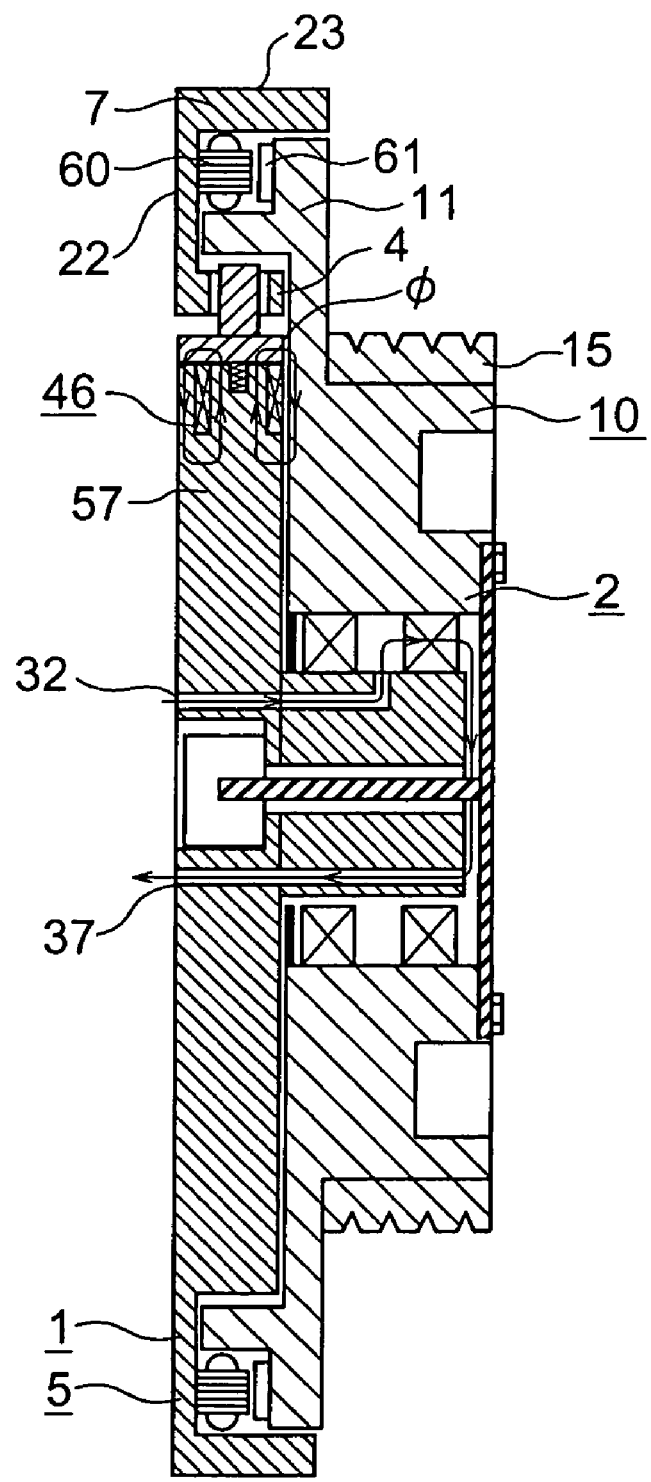
FIG. 16 is a sectional view taken along the rotational axis of the elevator hoist apparatus of the eighth embodiment of the present invention.

The elevator hoist apparatus shown in FIG. 16 has a structure similar to that of Embodiment 7 shown in FIG. 15 except that the motor portion is an axial gap motor. That is, the stationary elements 60 are attached to the annular plate portion 22 and not to the cylindrical portion 23 and arranged within the space defined by the U-shaped cross section portion composed of the stationary element mounting portion 7 and the cylindrical portion 4 of the stationary frame member 5 and further defined by the rotary element mounting portion 11 extending in the radial and axial directions. Also, the rotary elements 61 are arranged in axially opposing relationship with respect to the stationary elements 60.

Embodiment 9

Figure 17:
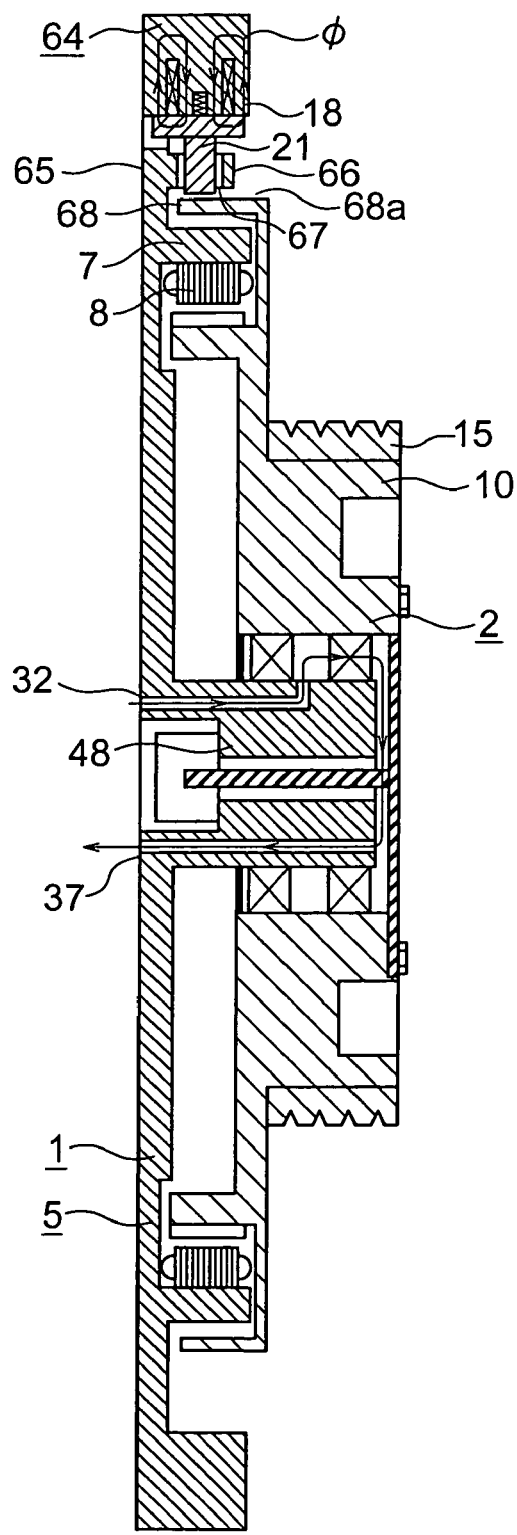
FIG. 17 is a sectional view taken along the rotational axis of the elevator hoist apparatus of the ninth embodiment of the present invention.

In the elevator hoist apparatus shown in FIG. 17, the basic structure is the same as that of Embodiment 7 shown in FIG. 15, but a brake unit 64 similar to that of Embodiment 7 is disposed on the outer circumferential portion of the rotary member with their radial orientation reversed. That is, although the structure of the brake unit 64 per se is similar to that already explained, it is disposed radially outside of the frame member cylindrical portion 66 provided on the radially extended outer circumferential portion of the stationary frame member 65, and the arrangement is such that the brake portion 21 that extends through the opening portion 67 formed in the cylindrical portion 66 is urged against the brake surface 68a which is the outer circumference surface of the rotary member cylindrical portion 68. According to this structure, the brake surface 68a is the outer circumferential surface of the rotary member 2, providing a large radius to the brake surface 68a, so that a large brake torque can be obtained even with a small brake unit 64.

Embodiment 10

Figure 18:
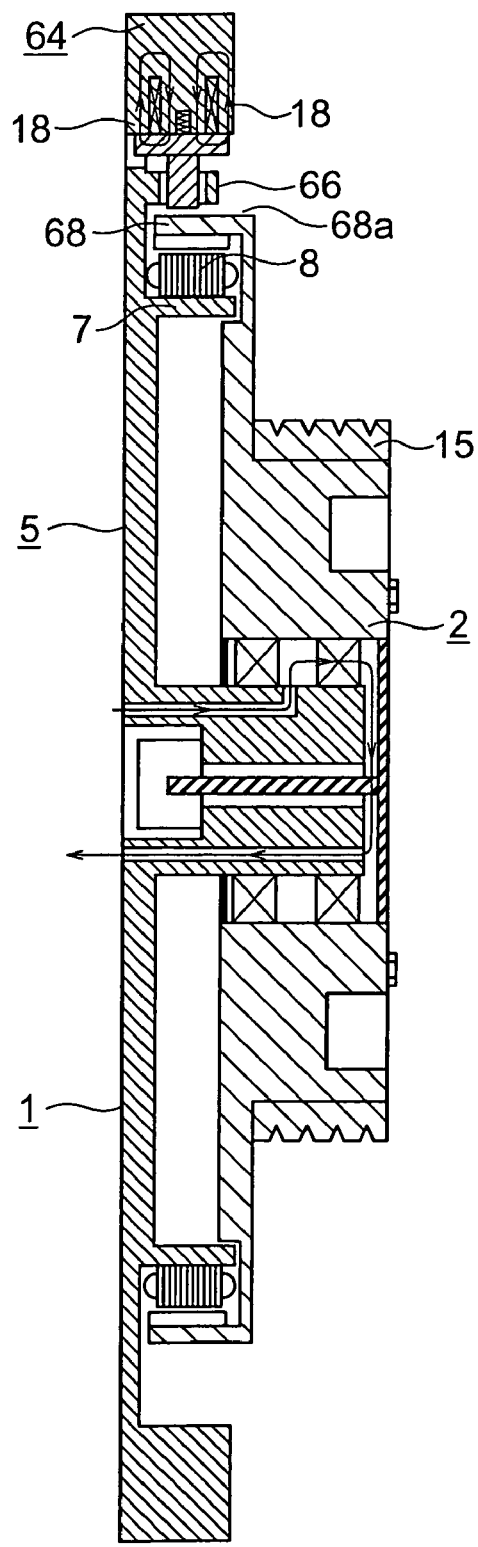
FIG. 18 is a sectional view taken along the rotational axis of the elevator hoist apparatus of the tenth embodiment of the present invention.

The elevator hoist apparatus shown in FIG. 18 has a structure similar to that of Embodiment 9 shown in FIG. 17 except that the motor portion is an outer rotor motor. Similarly to Embodiment 9, the brake surface 68a is the outer circumferential surface of the rotary member 2, providing a large radius to the brake surface 68a, so that a large brake torque can be obtained even with a small brake unit 64.

Embodiment 11

Figure 19:
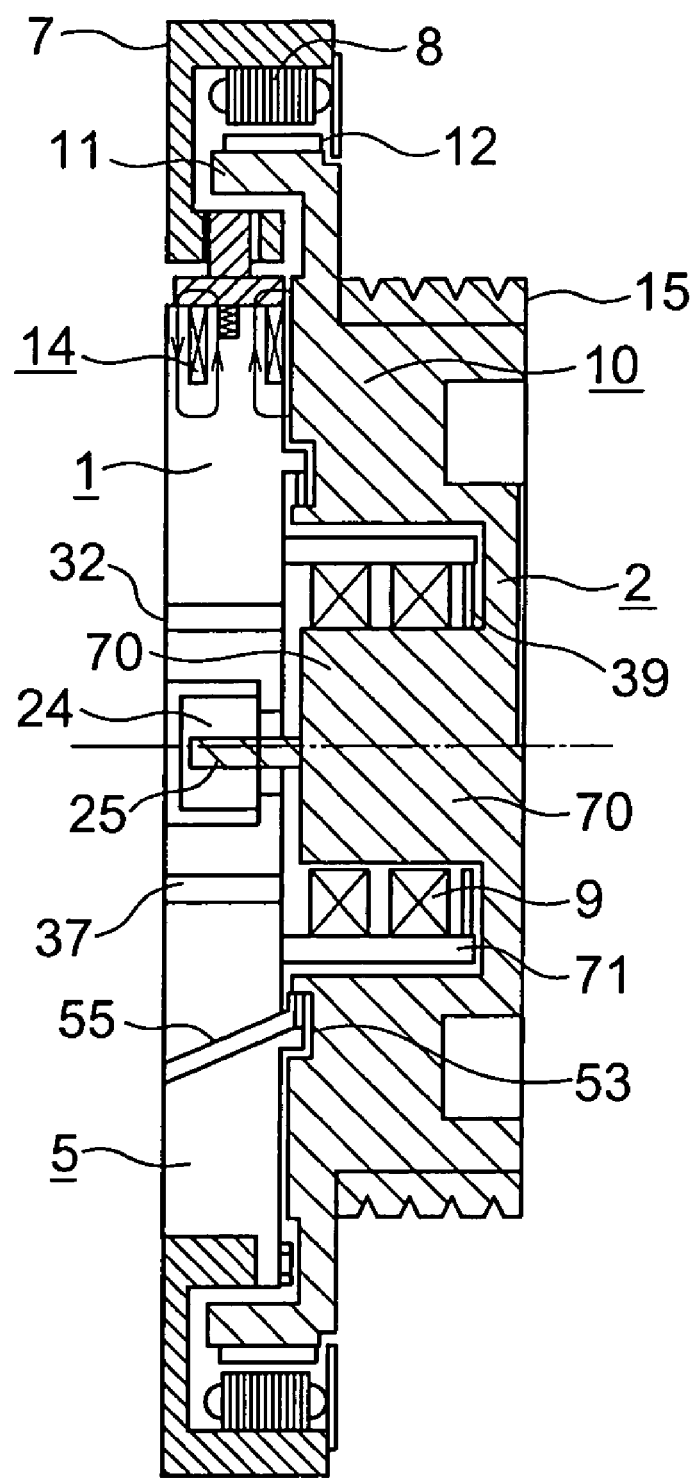
FIG. 19 is a sectional view taken along the rotational axis of the elevator hoist apparatus of the eleventh embodiment of the present invention.

In the elevator hoist apparatus illustrated in FIG. 19, the main shaft 70 is disposed on the side of the rotary member 2 and not on the stationary member 1. That is, the stationary frame member 5 of the stationary member 1 has disposed thereon a cylindrical support portion 71 concentrically raised from the stationary frame member 5, and a main shaft 70 extending from the rotary frame member 10 is inserted into the support portion 71. The bearing 9 is disposed between the inner circumferential surface of the support portion 71 and the outer circumferential surface of the main shaft 70 for allowing the rotary frame member 10 to rotate with respect to the stationary frame member 5. Extended from the end face of the main shaft 70 is an axially aligned encoder rotary shaft 25 for allowing the encoder 24 mounted to the stationary frame member 5 to detect the number of rotation. In this embodiment, too, the oil inlet port 32 and outlet port 37 for the lubricating oil for the bearing 9 are provided, the seals 39 and 53 are provided for preventing the lubricating oil leakage, and also the drain port 55 for draining the lubricating oil leaked from the seal 53 is provided. In other respects, the structure may be similar to that of the other embodiments, but in illustrated example the overall structure is similar to that of the embodiment shown in FIG. 14.

While various embodiments explained heretofore are described as employing a PM motor that uses permanent magnets as the rotary elements 12, the PM motor is not limiting and the present invention is equally applicable to other motors such as IPM motor and induction motor, etc.

Further, in the examples heretofore explained as the embodiments of the present invention, the support of the main shaft is described as being the cantilever type support, but the present invention is also applicable to that where the shaft is supported at both ends.

The invention claimed is:

1. An elevator hoist apparatus comprising:
   a stationary frame member;
   a main shaft;
   a stationary element disposed to said stationary frame member;
   a rotary frame member supported on said main shaft and extending in a radial direction in axial opposition to said stationary frame member;
   a rotary element disposed to said rotary frame member in opposition to said stationary member;
   a brake unit including a brake portion extending through an opening in said stationary frame member, said braking portion being radially guided by said opening; and
   a rope sheave disposed to said rotary frame member for rotation therewith.

2. An elevator hoist apparatus as claimed in claim 1, wherein said brake unit is disposed on an inner circumference of said stationary frame member and said rotary element.

3. An elevator hoist apparatus as claimed in claim 1, wherein
   one portion of said rotary frame member or said stationary frame member defines one portion of a magnetic path for said electromagnetic coil of said brake unit.

4. An elevator hoist apparatus as claimed in claim 1, wherein
   said stationary frame member is disposed between said brake unit and said rope sheave in the direction of the axis of said main shaft.

5. An elevator hoist apparatus as claimed in claim 1, wherein said main shaft extends in a cantilever manner from said stationary frame member or said brake unit for pivotally supporting said rotary frame member.

6. An elevator hoist apparatus as claimed in claim 5, wherein said main shaft and said stationary frame member are structured into an integral, single piece member continuous to each other.

7. An elevator hoist apparatus as claimed in claim 1, wherein said main shaft extends in a cantilever manner from said rotary frame member to said stationary frame member and supported from said stationary frame member via a bearing.

8. An elevator hoist apparatus as claimed in claim 7, wherein said main shaft and said rotary frame member are structured into an integral, single piece member continuous to each other.

9. An elevator hoist apparatus as claimed in claim 1, further comprising a stationary element mounting portion supported from said stationary frame member;
said stationary element mounting portion being an annular member having an L-shaped cross section and including an annular plate portion disposed at an outer circumferential portion of said stationary frame member and radially extending from said stationary frame member; and a cylindrical portion axially extending from said annular plate portion.

10. An elevator hoist apparatus as claimed in claim 1, further comprising a stationary element mounting portion supported from said stationary frame member;
said stationary frame member including a radial portion extending in a radial direction and supporting said main shaft and a stationary frame member cylindrical portion axially extending from said radial portion;
said stationary frame member cylindrical portion and said stationary element mounting portion having an L-shaped cross section together constituting a U-shaped cross section portion.

11. An elevator hoist apparatus as claimed in claim 10, wherein said brake unit is disposed axially outwardly of said stationary frame member cylindrical portion.

12. An elevator hoist apparatus as claimed in claim 11, wherein said stationary frame member cylindrical portion of said stationary frame member is disposed radially outwardly of said stationary element mounting portion.

13. An elevator hoist apparatus as claimed in claim 1, further comprising a stationary element mounting portion supported from said stationary frame member, wherein
said stationary frame member includes a radial portion extending in a radial direction and supports said main shaft and a stationary frame member cylindrical portion axially extending from said radial portion, and
said stationary element mounting portion has an L-shaped cross section and is disposed so that said stationary element mounting portion extends radially outwardly from said stationary frame member cylindrical portion.

14. An elevator hoist apparatus as claimed in claim 1, further comprising a stationary element mounting portion supported from said stationary frame member;
said stationary frame member including a radial portion extending in a radial direction and supporting said main shaft and a stationary frame member cylindrical portion axially extending from said radial portion;
said stationary element mounting portion being disposed radially inwardly of said stationary frame member cylindrical portion.

15. An elevator hoist apparatus as claimed in claim 1, further comprising a stationary element mounting portion supported from said stationary frame member and a rotary element mounting portion supported from said rotary frame member;
said rotary frame member being disposed in an axial opposition to said stationary member.

16. An elevator hoist apparatus as claimed in claim 1, wherein said brake unit is disposed within axial dimensions of said stationary element mounting portion of said stationary frame member or said rotary element mounting portion of said rotary frame member.

17. An elevator hoist apparatus as claimed in claim 1, wherein said brake unit is in direct opposition to said rotary frame member.

18. An elevator hoist apparatus as claimed in claim 1, wherein a brake frame of said brake unit is made an integral portion continuous to said stationary frame member.

19. An elevator hoist apparatus as claimed in claim 1, wherein said brake unit is disposed into said stationary frame member and into said rotary frame member in an identical direction.

20. An elevator hoist apparatus as claimed in claim 1, wherein said brake unit, said main shaft or said stationary frame member have an encoder accommodated therein, and a rotary shaft for the encoder mounted to said rotary frame member extends through said main shaft or said brake unit for transmitting a rotary signal to said encoder.

* * * * *